Figure 4:
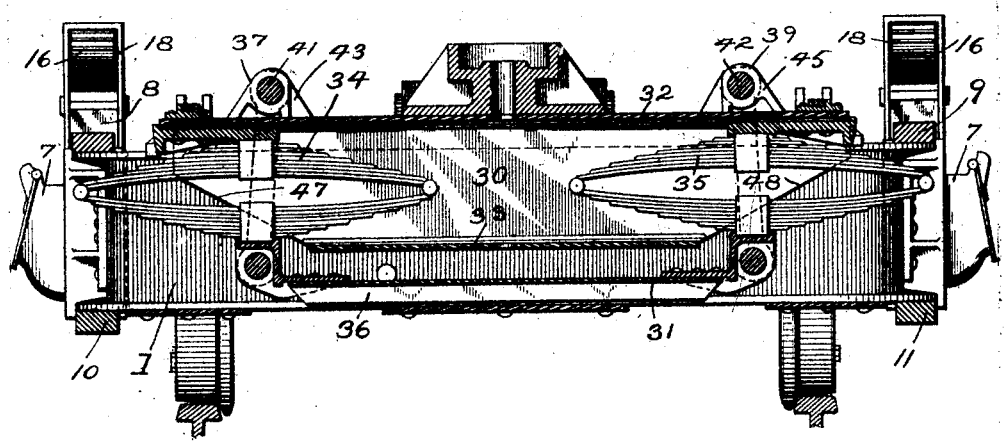

A. F. BATCHELDER.
ELECTRIC TRUCK.
APPLICATION FILED APR. 7, 1906.
977,156.
Patented Nov. 29, 1910.
3 SHEETS—SHEET 1.
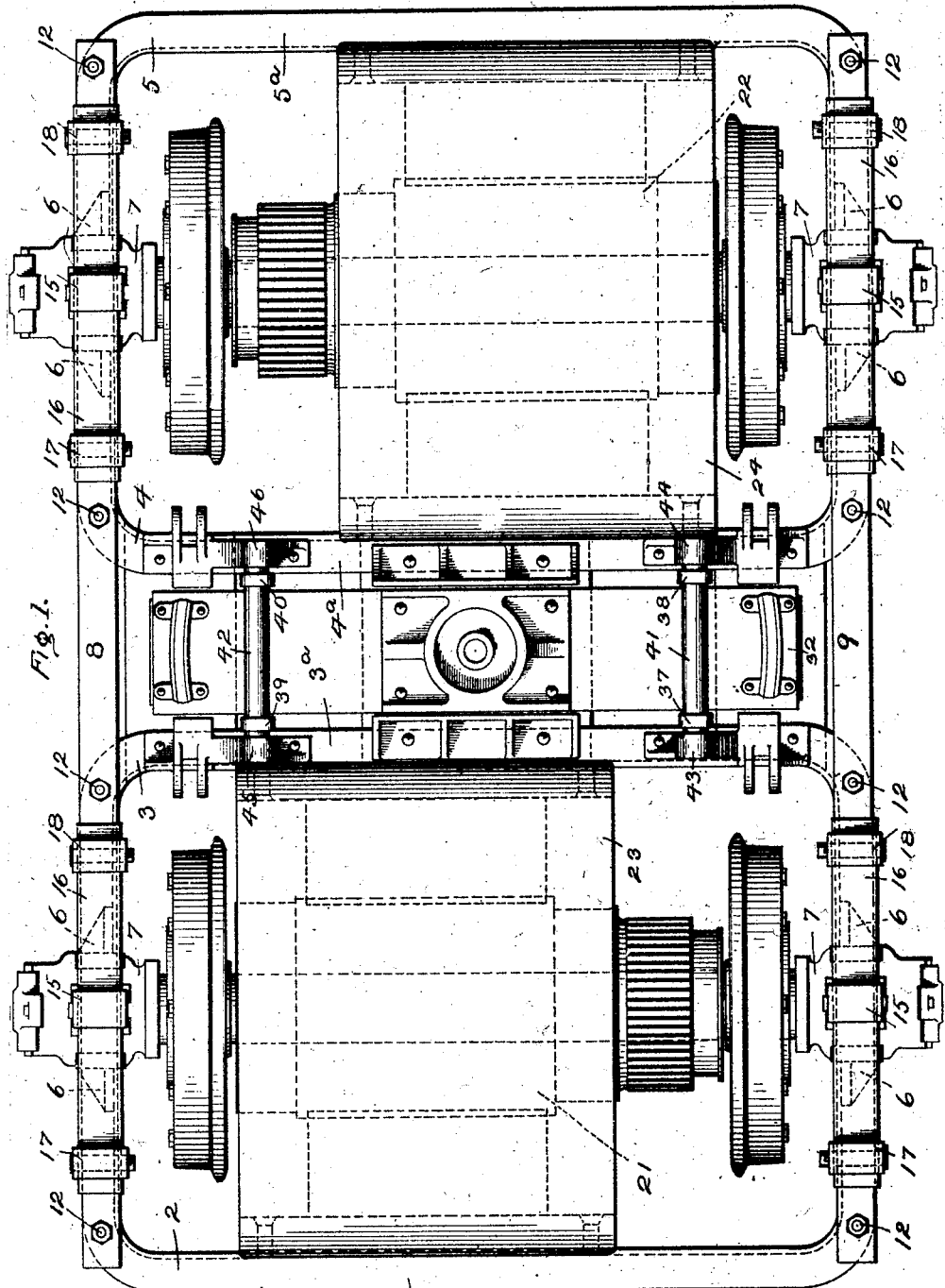
WITNESSES.
W. Ray Taylor.
Helen Oxford.
INVENTOR.
ASA F. BATCHELDER.
by Albert H. Davis
Atty A. F. BATCHELDER.
ELECTRIC TRUCK.
APPLICATION FILED APR. 7, 1906.
977,156.
Patented Nov. 29, 1910.
3 SHEETS—SHEET 2.
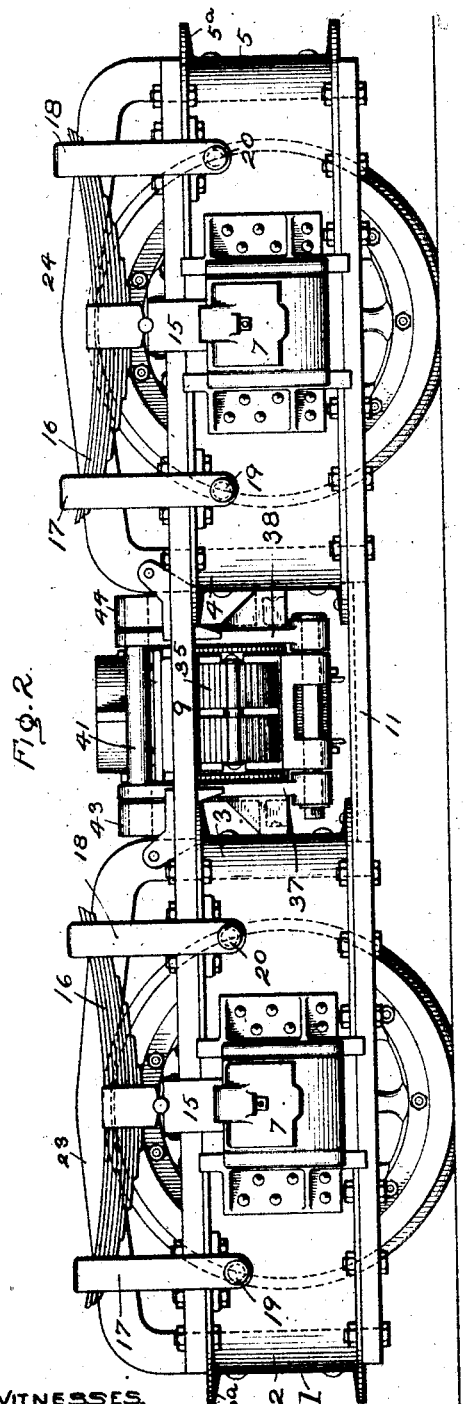
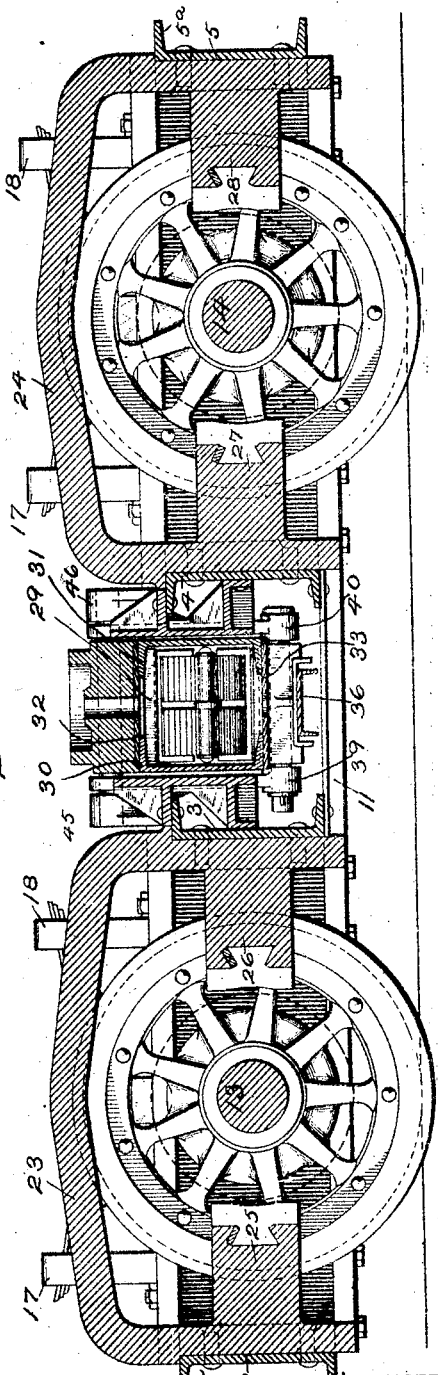
WITNESSES.
W. Ray Taylor
Helen Oxford
INVENTOR
ASA F. BATCHELDER.
by Albert H. Davis
Atty.

A. F. BATCHELDER.
ELECTRIC TRUCK.
APPLICATION FILED APR. 7, 1906.

977,156.

Patented Nov. 29, 1910.
3 SHEETS—SHEET 3.

WITNESSES:
W. Ray Taylor
Helen U. Ford

INVENTOR.
ASA F. BATCHELDER.
by
Atty.

UNITED STATES PATENT OFFICE.

ASA F. BATCHELDER, OF SCHENECTADY, NEW YORK, ASSIGNOR TO GENERAL ELECTRIC COMPANY, A CORPORATION OF NEW YORK.

ELECTRIC TRUCK.

977,156.  Specification of Letters Patent.  Patented Nov. 29, 1910.

Application filed April 7, 1906. Serial No. 310,413.

*To all whom it may concern:*

Be it known that I, ASA F. BATCHELDER, a citizen of the United States, residing at Schenectady, in the county of Schenectady, State of New York, have invented certain new and useful Improvements in Electric Trucks, of which the following is a specification.

The present invention relates to trucks and particularly to trucks for electrically propelled cars. It has heretofore been customary to adapt trucks for electric service by slightly rearranging them so as to provide room for motors. The motors have been introduced as units complete in themselves and entirely separate from the truck structure except that the trucks serve as supports. Such arrangements, while answering the requirements for ordinary urban service, obviously impose limitations in design such that the most advantageous results as to simplicity, strength, durability and efficiency cannot be obtained. For heavy service, however, such, for example, as auxiliary local traffic on steam roads, the motor and truck apparatus assumes such importance that the design should be such as to produce the best results as to simplicity of construction, durability and efficiency, both from mechanical and electrical standpoints.

The present invention therefore has for its object to provide an electric truck wherein the mechanical and electromagnetic features are so constructed and arranged with reference to each other as to insure the greatest simplicity, durability and efficiency in the truck as a whole.

To the above ends I mount the armatures directly upon the driving axles so as to obviate the necessity of gearing between the motor and axles, and arrange the truck frame so that each armature is situated within a rectangular frame, two of the sides of which constitute a transom member and an end member. These frames are preferably made of a few deep flanged plates tied together into one rigid structure. The field magnets preferably take the form of U-shaped yokes, the arms of each of which are rigidly secured to a transom member and to an end member of the truck frame. The truck frame and the field magnet structure or structures thus constitute a single unit composed of parts rigidly connected together and mutually supporting each other so as to form an exceedingly strong whole. This unit is yieldingly supported upon the axles and therefore the field magnets move relatively to the armatures. The field magnets are each provided with a pair of inwardly-projecting pole-pieces arranged in the plane of the axles and having their pole-faces so constructed that the pole-pieces may remain clear of the armatures as the truck frame moves up and down.

The present invention also comprises a novel form of swing bolster adapted to be hung between the transom members; this bolster being so constructed that a maximum rigidity of the bolster body is obtained for any given height of springs upon which the body is supported.

The present invention in its various aspects will be more fully understood and its objects and advantages will more clearly appear from the following description.

In the accompanying drawing which illustrates a preferred embodiment of my invention, Figure 1 is a plan view of the truck; Fig. 2 is a side elevation thereof; Fig. 3 is a longitudinal section; and Fig. 4 is a cross-section through the center of the truck showing the bolster construction.

Reference being had to the drawings, 1 indicates the truck frame which is composed of four U-shaped members, 2, 3, 4 and 5, preferably made of deep channel-iron and so arranged that parts of the members 3 and 4 form transoms 3ᵃ and 4ᵃ, while parts of the members 2 and 5 form end pieces 2ᵃ and 5ᵃ; the transoms and the end pieces being arranged parallel to each other. The ends of the arms of the members 2, 3, and 4, 5, are slightly separated from each other and are provided with pedestal pieces 6 between which the journal boxes 7 are slidingly mounted. The four U-shaped members are tied together into one rigid whole by means of top pieces 8 and 9 and bottom pieces 10 and 11. These top and bottom pieces extend throughout the length of the truck frame, and, where the U-shaped members are made of channel-iron or other flanged construction, these pieces are secured to the top and bottom flanges of the arms of the members, as by means of bolts 12. When the several parts are fastened together a very stiff and rigid construction is produced and one which cannot easily be distorted under ordinary conditions.

13 and 14 are driving axles journaled in the boxes 7, and the truck frame is carried upon the axles and axle boxes through suitable spring suspensions.

A convenient form of suspension consists in yokes 15 resting upon the axle boxes, together with semi-elliptical springs 16 supported upon the yokes and carrying at the ends hangers 17 and 18 which are pivotally connected to the truck frame at 19 and 20, respectively.

Motor armatures 21 and 22 are mounted on the axles 13 and 14, respectively. The field magnets are preferably bi-polar and consist of broad U-shaped yokes 23 and 24 having their arms riveted or otherwise secured to the broad web of the end and transom members. Pole-pieces 25 and 26 project inwardly from the arms of the yoke 23 into close proximity to the armature, and pole pieces 27 and 28 are similarly associated with the yoke 24. The pole pieces are all arranged in a horizontal plane so that the entire field structure may ride up and down with the truck frame. It will be seen that the truck frame is materially stiffened by reason of the field magnets, so that the arrangement of parts which provides a simple and compact field structure serves also to make the truck frame stronger mechanically.

The swing bolster consists of a body portion 29 preferably built up in the form of an elongated box of channel members 30 and 31 and top and bottom members 32 and 33; this box-like member being supported upon sets of springs 34 and 35 which rest upon the end of a frame 36. The frame 36 is hung between the transom members by means of links 37 and 38 and 39 and 40, the upper ends of which are journaled upon shafts 41 and 42 carried by brackets 43, 44, and 45, 46, rigidly secured to the transom. The lower corners of the box are cut away, as shown at 47 and 48, so as to clear the supports for the springs. Thus the inner ends of the springs may extend well into the body of the bolster and the lower portion of the body may drop below the supports for the springs. By this arrangement the body of the bolster may be made deep and strong without necessitating a decrease in the size of the supporting springs and without unduly elevating the top of the bolster.

Although I have illustrated only a preferred form of my invention I do not desire to be limited to the details illustrated except as particularly pointed out in the appended claims, since in its broader aspects the invention may take various forms.

What I claim as new and desire to secure by Letters Patent of the United States, is,—

1. In an electric truck, a truck-frame comprising transom members and end members rigidly connected together, an axle journaled between each end member and the corresponding transom member, a motor armature mounted upon one of said axles, and a field magnet supported upon the end member and the transom member between which said armature is located.

2. In an electric truck, a truck-frame comprising end members and intermediate transom members rigidly connected together, an axle arranged between each end member and the corresponding transom member, a yielding connection between said truck and said axles, motor armatures mounted on said axles, and a field magnet supported upon each end member and the corresponding transom member.

3. In an electric truck, a truck-frame comprising four U-shaped members arranged to form two rectangles and top and bottom pieces rigidly connecting said members together, two of said members forming the transom and the other two members constituting end pieces, an axle journaled between the ends of each pair of members, motor armatures on said axles, and a field magnet supported upon each pair of members.

4. In an electric truck, a truck-frame comprising two pairs of U-shaped members arranged to form two rectangles and top and bottom pieces rigidly uniting said members, two of said members forming a transom and the other two members constituting end pieces, journal boxes yieldingly mounted between the adjacent ends of each pair of members, axles journaled in said boxes, motor armatures on said axles, and a field magnet supported upon each pair of members.

5. In an electric truck, a truck-frame comprising transom and end members rigidly connected together, an axle journaled between each end member and the corresponding transom member, motor armatures mounted upon said axles, and a U-shaped field magnet supported upon each transom member and the corresponding end member.

6. In an electric truck, a truck-frame comprising transom members and end members rigidly connected together, an axle journaled between each end member and the corresponding transom member, motor armatures mounted upon said axles, and field magnets each comprising a U-shaped yoke having pole-pieces projecting inwardly from the arms thereof, each of said field magnets being rigidly connected to one of the transom members and to the corresponding end member.

7. In an electric truck, a truck-frame comprising two pairs of U-shaped members arranged to form two rectangles, top and bottom pieces rigidly connecting said members together, two of said members forming a transom and the other two members forming end pieces, an axle journaled between each pair of members, motor armatures on said axles, a field magnet rigidly supported upon each transom member and the corresponding end member, and a swing bolster suspended between said transom members.

8. In an electric truck, a pair of axles, rectangular frames supported upon said axles a rigid connection between said frames, each of said frames forming a transom member and an end member, motor armatures mounted upon said axle, and a field magnet supported upon a transom member and the end member of each frame.

9. In an electric truck, a pair of axles, rectangular frames resiliently supported upon said axles, a rigid connection between said frames, each of said frames forming a transom member and an end member, motor armatures mounted upon said axles, and a field magnet rigidly supported upon the transom member and the end member of each frame.

10. In an electric truck, a truck-frame comprising channel-iron transom members and end members rigidly secured together, an axle journaled between each end member and the corresponding transom member, motor armatures mounted upon said axles, and field magnets comprising U-shaped yokes having pole-pieces projecting inwardly from the arms thereof, the arms of each of said yokes being rigidly secured respectively to the web of a transom member and to the web of an end member.

11. In a truck, a main frame having transoms extending transversely thereof, a frame suspended between said transoms and capable of movement transversely of the truck, a box-bolster, and elliptical springs arranged transversely of the truck between said suspended frame and the top of said bolster and engaging the same and serving to support the latter upon said suspended frame.

In witness whereof, I have hereunto set my hand this 6th day of April, 1906.

ASA F. BATCHELDER.

Witnesses:
BENJAMIN B. HULL,
HELEN ORFORD.